United States Patent
Yacoby

(10) Patent No.: US 12,487,416 B2
(45) Date of Patent: Dec. 2, 2025

(54) PACKAGING OF WHISPERING GALLERY MODE RESONATORS WITH ADJUSTABLE COUPLING TO AN OPTICAL FIBER

(71) Applicant: Soreq Nuclear Research Center, Yavne (IL)

(72) Inventor: Eyal Yacoby, Yavne (IL)

(73) Assignee: Soreq Nuclear Research Center, Nahal Soreq (IL)

( * ) Notice: Subject to any disclaimer, the term of this patent is extended or adjusted under 35 U.S.C. 154(b) by 341 days.

(21) Appl. No.: 18/354,672

(22) Filed: Jul. 19, 2023

(65) Prior Publication Data

US 2024/0019648 A1    Jan. 18, 2024

Related U.S. Application Data

(60) Provisional application No. 63/389,908, filed on Jul. 17, 2022.

(51) Int. Cl.
*G02B 6/42*        (2006.01)

(52) U.S. Cl.
CPC .................................. *G02B 6/424* (2013.01)

(58) Field of Classification Search
CPC ........................... G02B 6/29341; G02B 6/424
See application file for complete search history.

(56) References Cited

U.S. PATENT DOCUMENTS

2021/0255213 A1*  8/2021  Otugen ................ G01P 15/093

* cited by examiner

*Primary Examiner* — Chad H Smith
(74) *Attorney, Agent, or Firm* — Dekel Patent Ltd.; David Klein

(57) ABSTRACT

A method includes coupling an optical whispering gallery mode (WGM) resonator to an optical fiber by placing the optical fiber on the WGM resonator such that a contact portion of the optical fiber contacts the WGM resonator and two non-contact portions of the optical fiber extend beyond the contact portion, coupling the non-contact portions to locking screws, and adjusting positions of the locking screws to change a dimension of the contact portion.

9 Claims, 2 Drawing Sheets

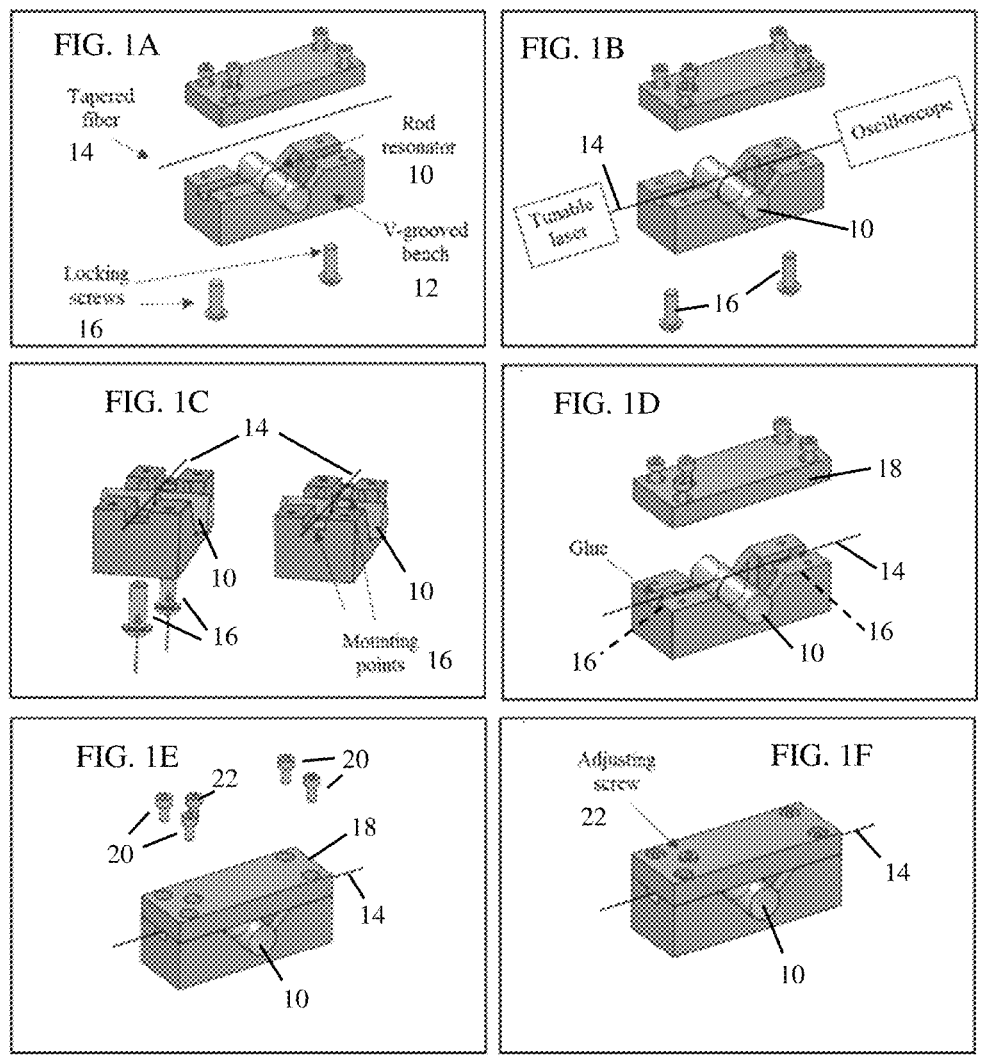
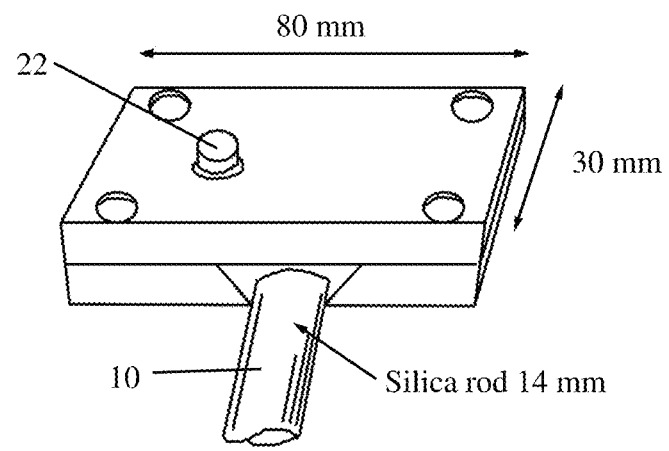
FIG. 2

PACKAGING OF WHISPERING GALLERY MODE RESONATORS WITH ADJUSTABLE COUPLING TO AN OPTICAL FIBER

FIELD OF THE INVENTION

The present invention relates generally to optical whispering gallery mode (WGM) resonators, such as WGM rod resonators, and particularly to adjustable coupling of the WGM resonator to an optical fiber.

BACKGROUND OF THE INVENTION

Optical Whispering Gallery Mode (WGM) resonators are an ideal platform for high sensitive sensors. Coupling light to WGM resonators may be achieved via evanescent coupling using a prism, or a tapered fiber (TF). Whereas the latter is considerably cheaper and of higher efficiency (lower optical losses), it suffers from low mechanical stability due to the small diameter of the TF, which is typically a few microns. In order for the TF coupling to be practical, the resonator and the TF must be packaged robustly to maintain the coupling regime stability. The ability to package the resonator in a stable manner is crucial from an application standpoint.

Packaging of TF coupled microresonators has been done in the prior art by immersing the coupling region (including the entire microresonator) in an ultraviolet (UV)—curable material, and "freezing" the relative orientation of the microresonator with respect to that of the TF. While providing high mechanical stability, this method results in a sharp degradation of the microresonators Q factor, sometimes by orders of magnitude, depending on the optical properties of the material. Furthermore, the fact that the entire microresonator is immersed in the curable glue limits its sensitivity to environmental changes. In many cases, external sensing is reached via the interaction between the WGM evanescent field and the surrounding media. Here the glue "shields" the evanescent field from such interactions. An alternative packaging method can be established by clamping the TF at two (or more) points as close as possible to the microresonator. However, this method is of lower mechanical stability than the other method of gluing.

SUMMARY

The present invention seeks to provide packaging of WGM resonators with the ability to tune and adjust the coupling efficiency using an adjusting screw. The adjusting screw, when fastened, moves the tapered fiber toward the resonator, and therefore changes the effective coupling length. In turn, the coupling length determines the coupling efficiency.

In one non-limiting embodiment of the invention, a simple packaging technique is provided with the possibility to perform coupling adjustment while the resonator and the tapered fiber are coupled and packaged. The ability to perform coupling adjustment makes it possible to modulate the transmission power of the tapered fiber, as well as the loaded Q factor of the resonator.

In one non-limiting embodiment of the invention, a WGM resonator, bonded with adhesive to the base of the used package, is coupled to a tapered optical fiber via evanescent coupling. Once the desired coupling regime is achieved, locking screws are fastened to the base and used as mechanical platforms for the tapered fiber. The position of the tapered fiber is then fixed by bonding it to the tip of the locking screws. An additional adjusting screw is inserted to apply pressure on the tapered fiber and push it toward the resonator. This increases the effective coupling length, and therefore changes the coupling efficiency.

There is provided in accordance with an embodiment of the invention a method of coupling a resonator and an optical fiber including coupling an optical whispering gallery mode (WGM) resonator to an optical fiber by placing the optical fiber on the WGM resonator such that a contact portion of the optical fiber contacts the WGM resonator and two non-contact portions of the optical fiber extend beyond the contact portion, coupling the non-contact portions to locking screws, and adjusting positions of the locking screws to change a dimension of the contact portion.

The WGM resonator may include a rod resonator and changing the dimension of the contact portion includes varying a radius of the optical fiber with respect to a longitudinal axis of the rod resonator.

Changing the dimension of the contact portion can change an effective coupling length of the WGM resonator to the optical fiber, a coupling efficiency of the coupling of the WGM resonator to the optical fiber, a transmission power of the optical fiber, or a loaded Q factor of the WGM resonator.

The contact portion includes a tapered region of the optical fiber. The non-contact portions include non-tapered regions of the optical fiber.

The method may further include using an adjusting screw to apply pressure on the optical fiber to readjust the dimension of the contact portion.

BRIEF DESCRIPTION OF THE DRAWINGS

The present invention will be understood and appreciated more fully from the following detailed description taken in conjunction with the drawings in which:

FIGS. 1A-1F illustrate steps of packaging the WGM resonator in accordance with a non-limiting embodiment of the invention, wherein FIG. 1A illustrates a WGM resonator placed on a v-grooved bench; FIG. 1B illustrates the resonator being brought to contact with the tapered fiber using a three-axis mechanical mount (not shown); FIG. 1C illustrates the locking screws being fastened until their tips are located 1-2 millimeters below the fiber; FIG. 1D illustrates the fiber being glued to the locking screw using a UV glue; FIG. 1E illustrates a top cover being attached to the bench using four screws; and FIG. 1F illustrates an additional screw being used to enable coupling adjustments.

FIG. 2 is a simplified illustration of the packaged WGM resonator device, in accordance with a non-limiting embodiment of the invention.

DETAILED DESCRIPTION

Figure 3A:
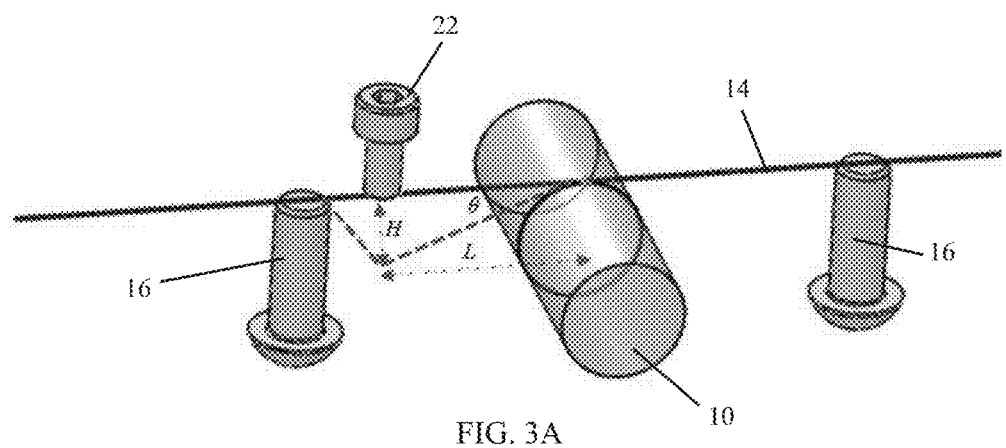
FIG. 3A is a simplified illustration of the adjusting screw, when fastened, pushing the tapered fiber toward the rod resonator.

The unique packaging technique of the invention provides the ability to tune the coupling efficiency while the resonator and the tapered fiber are coupled and packaged. FIGS. 1A-1F illustrate steps of packaging the WGM resonator in accordance with a non-limiting embodiment of the invention.

First, a WGM resonator 10, such as a WGM rod resonator, is placed on a v-grooved bench 12, such as at the center of the bench (FIG. 1A). Then the resonator 10 is brought in contact with an optical fiber 14, such as a tapered fiber, e.g., using a three-axis mechanical mount (FIG. 1B). The contact point of the resonator 10 with the tapered fiber 14 strongly affects the coupling regime due to the varying radius of the tapered fiber with respect to the longitudinal axis of the resonator. The contact point is therefore set according to the desired coupling regime. In order to maintain the fiber 14 at a specific position after the desired coupling is achieved, locking screws 16 at both ends of the fiber 14 are used. The screws 16 are fastened until their tips are located a few millimeters below the fiber 14 (FIG. 1C). The fiber 14 is bonded to the locking screws 16 with adhesive (FIG. 1D).

The ability to control the position of the tips of the locking screws 16, which are used as mechanical mounts for the tapered fiber 14, makes it possible to apply this packaging to different resonators diameters, and eliminates the sensitivity to the fiber angle. The locking screws 16 may be located below a non-tapered region of the fiber 14 in order to avoid optical transmission losses. The position of the locking screws 16 may then be fixed, such as by gluing the screw threading.

A top cover 18 is used to protect the device from airflow, and is attached to the bench using four screws 20 (FIGS. 1E-1F). An additional adjusting screw 22 is inserted to apply pressure on the tapered fiber 14 in order to readjust the coupling regime post packaging.

Figure 3B:
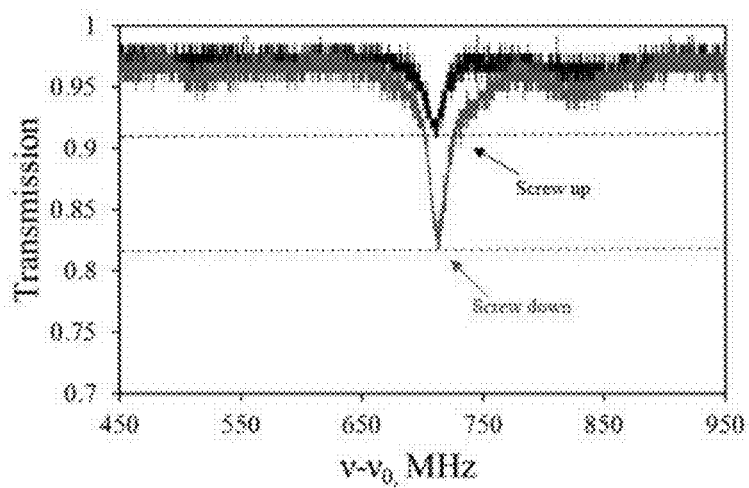
FIG. 3B is a simplified graphical illustration of an example of the variation in coupling efficiency using the adjusting screw.

FIG. 2 is a simplified illustration of the packaged WGM resonator device, in accordance with a non-limiting embodiment of the invention Example One non-limiting example uses a silica rod resonator with a diameter of 14 mm. The rod resonator is disposed on an optical fiber preform, such as by using a $CO_2$ laser. An example of the coupling efficiency adjustment using the adjusting screw (M4, 0.7 mm pitch) is shown in FIGS. 3A-3B. In this example, the screw rotation is about $\sim\varphi=20$-$30$ degrees, corresponding to a vertical displacement of $H\sim40$-$60$ μm (pitch·$\varphi/360$). This vertical displacement, in turn, increases the contact length between the rod resonator and the tapered fiber, $L_c$, by $\Delta L_c = R_{rod} \cdot \theta$, where $R_{rod}$ is the rod resonator radius and $\theta$ is the angle forced on the tapered fiber (see FIG. 3A). For small angles, $\theta$ can be approximated as $\theta = H/L$ where L is the distance between the adjusting screw and the resonator-fiber contact point. For a given rod resonator and a given tapered fiber diameter, the value of L determines the responsivity of the coupling adjustment to the angle of the adjusting screw, and may be designed according to requirements. In our case L=23 mm, therefore the applied vertical displacement $H\sim50$ μm corresponds to $\theta\sim2.6\cdot10^{-3}$ rad, and to an applied $\Delta L_c$ of ~15 μm.

Changing the contact length by $\Delta L_c$ alters the coupling efficiency, and as a consequence, the WGM dip (shown in the tapered fiber's transmission spectrum) decreased from 0.91 down to 0.82 (FIG. 3B). The dependence of the coupling efficiency on $L_c$ is determined by the spatial distribution of the rod resonator and tapered fiber optical modes, as well as on the mode's phase matching. Therefore it strongly depends on the geometry of the resonator, and on the diameter of the tapered fiber.

TABLE 1

Relevant parameters in the example

| Parameter | Symbol | Value |
| --- | --- | --- |
| Resonator diameter | D | 14 mm |
| Adjustment screw rotation angle | φ | 20-30 degrees |
| Adjustment screw vertical displacement | H | 40-60 μm |
| Distance between adjusting screw | L | 23 mm |
| Resonator-tapered fiber contact length | $L_c$ | |

What is claimed is:

1. A method of coupling a resonator and an optical fiber comprising:
   coupling an optical whispering gallery mode (WGM) resonator to an optical fiber by placing said optical fiber on said WGM resonator such that a contact portion of said optical fiber contacts said WGM resonator and two non-contact portions of said optical fiber extend beyond said contact portion, coupling said non-contact portions to locking screws, and adjusting positions of said locking screws to change a dimension of said contact portion.

2. The method according to claim 1, wherein said WGM resonator comprises a rod resonator and changing the dimension of said contact portion comprises varying a radius of said optical fiber with respect to a longitudinal axis of said rod resonator.

3. The method according to claim 1, wherein changing the dimension of said contact portion changes an effective coupling length of said WGM resonator to said optical fiber.

4. The method according to claim 1, wherein changing the dimension of said contact portion changes a coupling efficiency of the coupling of said WGM resonator to said optical fiber.

5. The method according to claim 1, wherein changing the dimension of said contact portion changes a transmission power of said optical fiber.

6. The method according to claim 1, wherein changing the dimension of said contact portion changes a loaded Q factor of said WGM resonator.

7. The method according to claim 1, wherein said contact portion comprises a tapered region of said optical fiber.

8. The method according to claim 1, wherein said non-contact portions comprise non-tapered regions of said optical fiber.

9. The method according to claim 1, further comprising using an adjusting screw to apply pressure on said optical fiber to readjust said dimension of said contact portion.

* * * * *